US008387137B2

United States Patent
Lee et al.

(10) Patent No.: US 8,387,137 B2
(45) Date of Patent: Feb. 26, 2013

(54) ROLE-BASED ACCESS CONTROL UTILIZING TOKEN PROFILES HAVING PREDEFINED ROLES

(75) Inventors: Ade Lee, Cary, NC (US); Christina Fu, Saratoga, CA (US)

(73) Assignee: Red Hat, Inc., Raleigh, NC (US)

( * ) Notice: Subject to any disclaimer, the term of this patent is extended or adjusted under 35 U.S.C. 154(b) by 440 days.

(21) Appl. No.: 12/652,690

(22) Filed: Jan. 5, 2010

(65) Prior Publication Data
US 2011/0167483 A1 Jul. 7, 2011

(51) Int. Cl.
*G06F 7/04* (2006.01)
(52) U.S. Cl. .............................. 726/20; 726/18; 713/156
(58) Field of Classification Search .................. 726/28, 726/20
See application file for complete search history.

(56) References Cited

U.S. PATENT DOCUMENTS

| | | | | |
|---|---|---|---|---|
| 5,941,947 A | * | 8/1999 | Brown et al. | 709/225 |
| 6,360,952 B1 | * | 3/2002 | Kimlinger et al. | 235/492 |
| 6,514,140 B1 | * | 2/2003 | Storch | 463/25 |
| 2002/0031230 A1 | * | 3/2002 | Sweet et al. | 380/278 |
| 2002/0129135 A1 | * | 9/2002 | Delany et al. | 709/223 |

OTHER PUBLICATIONS

Red Hat Certificate System 8.0—Admin Guide, Publication date Jul. 22, 2009, Chapter 14, 54 pages, published at http://www.redhat.com/docs/manuals/cert-system/8.0/admin/Admin_Guide.pdf.

* cited by examiner

*Primary Examiner* — Cordelia Zecher
(74) *Attorney, Agent, or Firm* — Lowenstein Sandler LLP

(57) ABSTRACT

A method and system for managing role-based access control of token data using token profiles having predefined roles is described. In one method, a token processing system (TPS) assigns a TPS client a token profile for a group of multiple tokens, the token profile being stored in a profile data structure. The token profile specifies at least one of multiple predefined roles for the TPS client, each role associated with predefined access to entries of a token database. The TPS receives a request from the TPS client over a network to perform an operation on the entries of the token database that correspond to the group, and allows the TPS client access to the token database to perform the operation when permitted by the predefined roles specified in the token profile on the entries of the token database that correspond to the group identified by the token profile.

24 Claims, 11 Drawing Sheets

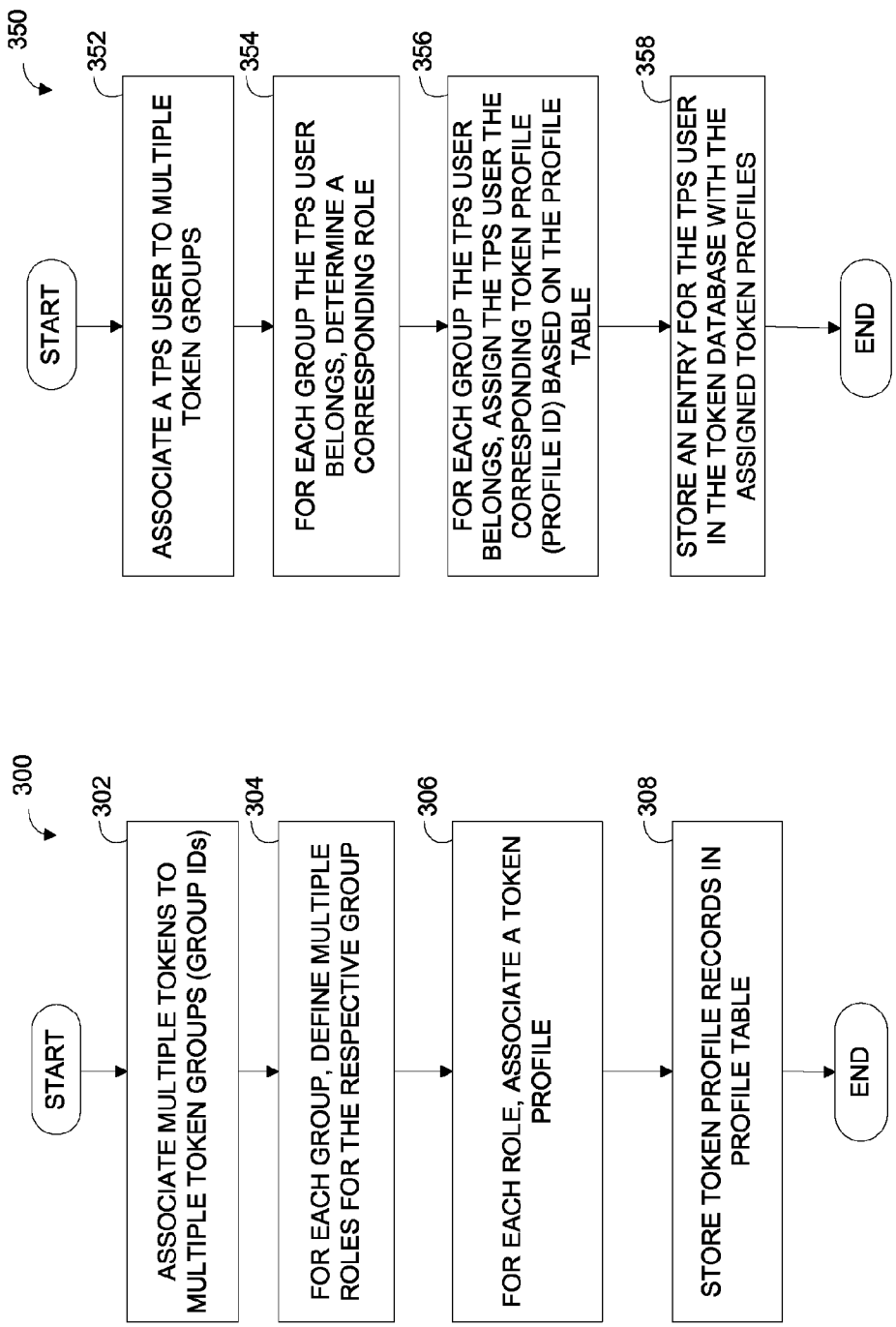

TPS SERVICES

MAIN MENU : ADMIN OPERATIONS : ADD NEW USER  UID: ADMIN

USER ID: jsmith

USER FIRST NAME: John

USER LAST NAME: Smith

ROLE: ☒ OPERATOR  ☒ AGENT  ☒ ADMIN

CERTIFICATE:
MIIDTjCCAjagAwIBAgIBCjANBgkghkiG9w0BAQUF
ADBAMR4wHAYDVQQKExVSZWRidWRjb21wdXR
b21haW4xHjAcBgNVBAMTFUN1cnRPZm1jYXR1T

ADD USER

FIG. 7C

ROLE-BASED ACCESS CONTROL UTILIZING TOKEN PROFILES HAVING PREDEFINED ROLES

RELATED APPLICATION

This application is related to co-pending U.S. application Ser. No. 12/652,675, entitled "Role-based access control utilizing token profiles," filed herewith, which is incorporated herein by reference.

TECHNICAL FIELD

Embodiments of the invention relate to the field of token data management, and more particularly, to role-based access control utilizing token profiles.

BACKGROUND

Network users frequently have to submit multiple passwords for the various services they use, such as email, web browsing and intranets, and servers on the network. Maintaining multiple passwords, and constantly being prompted to enter these passwords, is a hassle for users and administrators. Single sign-on is a configuration which allows administrators to create a single password store so that users can log in once, using a single password, and be authenticated against all network resources. For example, a system supporting single sign-on may be used for several resources, including logging into workstations and unlocking screen savers, accessing encrypted web pages using Mozilla Firefox, and sending encrypted email using Mozilla Thunderbird. Single sign-on is both a convenience to users and another layer of security for the server and the network. Single sign-on hinges on secure and effective authentication. The authentication may be managed by a public key infrastructure (PKI), such as implemented by a certificate system.

One of the cornerstones of establishing a secure network environment is making sure that access is restricted to people who have the right to access the network. This access is allowed when the user can authenticate to the system, meaning the user can verify his identity. One method of verifying an identity is presenting a digital signature or a digital certificate. A digital signature is a mathematical representation of a message, using public key cryptography, which identifies the originator of the message, in a non-forgeable manner. Public key cryptography requires the use of two mathematically related keys—a public key and a private key (collectively referred to as a key pair). The private key is kept private by a single owner, and is not distributed to anyone else. The owner uses his or her private key, in conjunction with cryptographic algorithms, to digitally sign a message. The public key is made public, and can be used by anyone to verify the digital signature on a message. The fact that these two keys are mathematically related ensures that only a single private key can generate a digital signature that is verifiable by the corresponding public key, making the digital signature unforgeable. A digital certificate, commonly referred to as a certificate, is an electronic document used to identify an individual, a server, a company, or another type of entity and to associate that identity with a public key. The digital certificate binds a public/private key pair to an owner, in a reliable fashion. The digital certificate binds a person's identity to his or her public key, and consequently to his or her private key, and is used to verify digital signatures. Digital certificates and digital signatures then provide the foundation for secure transactions over a network, such as the Internet.

These certificates can be stored on tokens, also referred to as smart card tokens, smart cards, security tokens, hardware tokens, USB tokens, cryptographic tokens, key fobs, or the like. The token may be a physical device that an authorized user of computer services is given to ease authentication. Tokens can store a certificate that is used for authenticating the identity of the owner. For example, when a user inserts a smart card into a system, the smart card presents the certificates to the system and identifies the user so the user can be authenticated over the network.

Typically, data associated with these tokens are managed in a database. There are circumstances where an organization may have multiple groups and desire to manage access to the token data for the respective groups. However, conventional systems that store all token data for the multiple groups within a single database fail to provide any mechanism to control access to the token data according to groups. For example, the organization may assign one user to be an administrator of the first token group and another user to be an administrator of the second token group, the first and second groups being stored in the same database. Since the token data associated with these tokens are stored in the same database, both administrators incidentally will be given access to view and modify token data corresponding to the other group, and there is no mechanism to prevent the administrator of one group from accessing the token data of the other group. Thus, existing certificate systems fail to provide an adequate mechanism to control access to the token data within the respective groups.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3A is a flow diagram of one embodiment of a method of defining token profiles for per-group role-based access control.

FIG. 3B is a flow diagram of one embodiment of a method of assigning a token profile to the TPS user for each group the TPS user belongs for the per-group role-based access control.

FIG. 7C illustrates an exemplary web page presented to a user by the token database access manager of FIG. 2B to add a new TPS user according to one embodiment.

DETAILED DESCRIPTION

Figure 1:
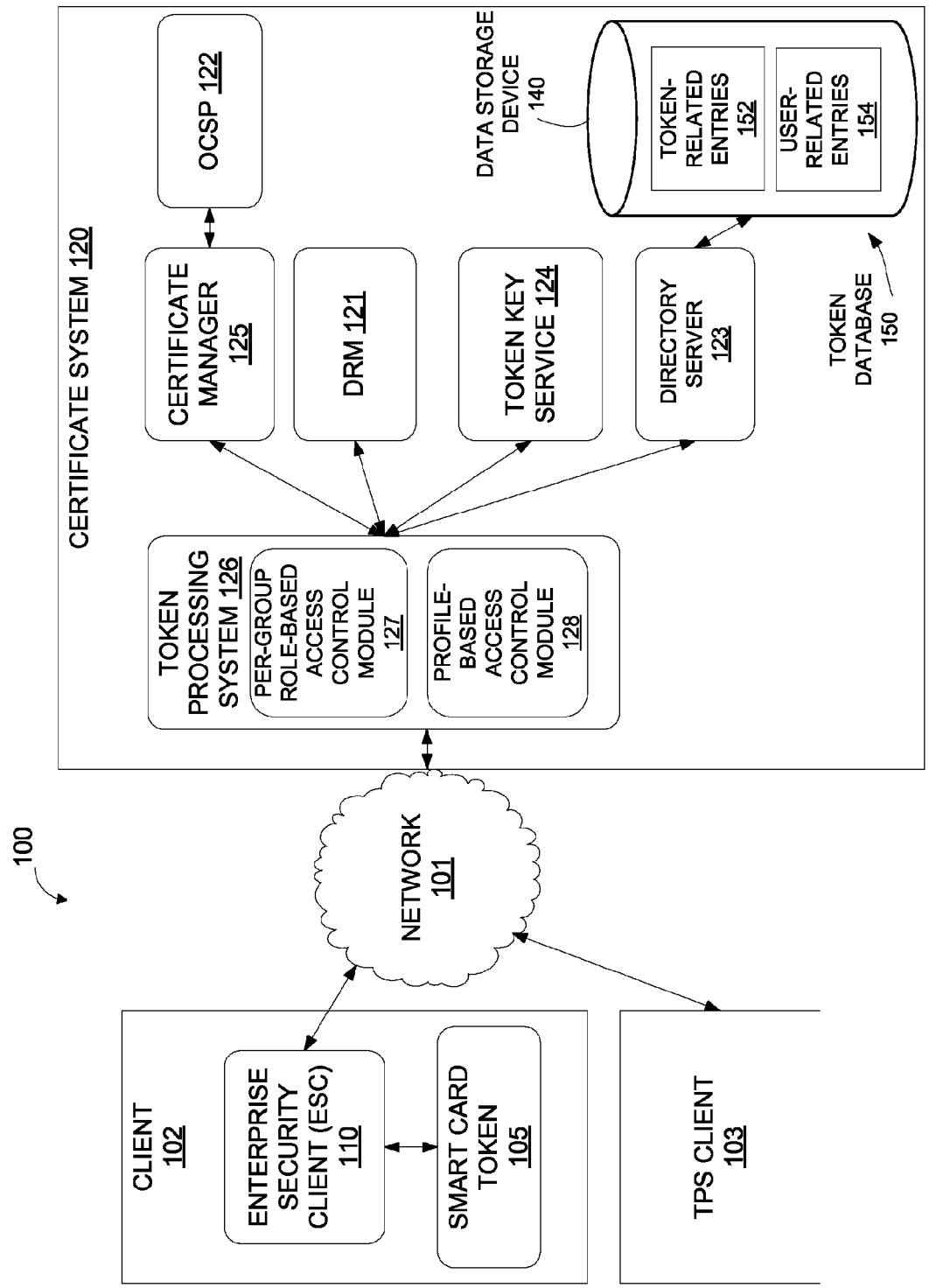
FIG. 1 is a block diagram of exemplary system architecture in which embodiments of a token processing system (TPS), having a per-group role-based access control module and/or a profile-based access control module, may operate.

A method and system for managing profile-based access control of token data is described. In one embodiment, a method, implemented by a token processing system (TPS) of a computing system, includes assigning a TPS user a token profile for a group having multiple tokens, the token profile specifying at least one predefined role for the TPS user, and allowing the TPS user access to the token database to perform an operation permitted by the predefined roles specified in the token profile on entries of the token database that correspond to a group identified by the token profile.

Embodiments of the present invention provide an improved approach to providing access control to token data of multiple token groups stored in a single database because the embodiments described herein can control access to token data on a group level unlike the conventional systems. Also, the embodiments described herein provide a simpler approach to providing role-based access control using predefined roles that define predefined access privileges to the token data of the group. By controlling access using the predefined roles within the respective group, the TPS can provide profile-based access control to the token data of the respective groups.

The embodiments described herein allow tokens to be assigned into groups, and for each group, multiple roles may be created to control access to the tokens in the respective groups. In some embodiments, each TPS user may belong to many groups and have different roles within each group. The TPS user has access privileges to see all tokens in all groups to which the TPS user belongs, but what the TPS user can do with the tokens within the groups depends on the access privileges, as specified by the token profile, the TPS user has in each group.

In some embodiments, the number of roles and the access privileges of each role may be defined by the organization that manages the tokens such as described with respect to embodiments of per-group role-based access control. In other embodiments, the number of roles and the access privileges of each role may be predefined, for example, three predefined roles of an operator, an agent, and an administrator, such as described with respect to the embodiments of profile-based access control. In general, operators have access privileges to view the tokens, certificates associated with the tokens, and/or activities for all tokens associated with that group. Agents have the same access privileges as the operators and also have access privileges to modify the token data, certificates, and/or activities. Administrators have access privileges to add, delete, or modify users (i.e., administrators, operators, or agents) for that particular group. The administrators may also have access privileges to view tokens, certificates, and activities associated with that group.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "assigning," "managing," "specifying," "allowing," "processing," "computing," "calculating," "determining," "displaying," or the like, refer to the actions and processes of a computer system, or similar electronic computing systems, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system specifically programmed by a computer program stored in the computer system. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a block diagram of exemplary system architecture 100 in which embodiments of a TPS 126, having a per-group role-based access control module 127 and/or a profile-based access control module 128, may operate. The architecture 100 includes a client 102, a TPS client 103, and a certificate system 120, each coupled to the network 101 that communicates any of the standard protocols for the exchange of information. The network 101 may be a Local Area Network (LAN) and may be incorporated into the same physical or logical system, or different physical or logical systems. Alternatively, the client 102, TPS client 103, and certificate system 120 may reside on different LANs that may be coupled together via the Internet (e.g., network 101), but separated by firewalls, routers, and/or other network devices. Alternatively, the network 101 may represent other types of public or private networks or any combination thereof, such as an intranet, an extranet, a cellular network, the Internet, or any combination thereof. The network connections may be LAN connections, Internet connections, Wi-Fi connections, 3G connections, or the like, and may use various types of protocols to communicate data to and from the certificate system 120 and the client 102 or the TPS client 103.

The client 102 and TPS client 103 may each be a personal computer (PC), such as a laptop or desktop computer, a tablet PC, a set-top box (STB), a gaming system, a portable electronic device, such as a mobile phone, personal digital assistant (PDA), wireless terminal, portable gaming system, or another wireless electronic device. The client 102 includes a client application, such as the depicted enterprise security client (ESC) 110 that communicates with the token 105 and the token processing system (TPS) 126 over the network 101. The ESC 110 is a user interface used by a user 103 of the client 102 and the token 105 (e.g., smart card) to communicate with the certificate system 120. The ESC 110 may be used in connection with the certificate system 120 to manage tokens, such as, formatting the tokens, issuing certificates for the tokens, renewing certificates for the tokens, and other management operations associated with the tokens stored on the token 105. End users can use security tokens, such as smart cards, to store user certificates, and can be used for applications such as single sign-on access and client authentication. The certificate system 120 issues certificates and keys required for signing, encryption, and/or other cryptographic functions to be stored on end user's tokens.

In the depicted embodiment, the certificate system 120 implements a token management system using three main components—the ESC 110, the TPS 126, and the token key service (TKS) 124. The TPS 126 and the TKS 124 are used to process token-related operations, and the ESC 110 is the interface that allows the smart card 105 to access these components of the token management system. For example, after a token is enrolled, applications such as Mozilla Firefox and Thunderbird can be configured to recognize the token and use it for security operations, like client authentication and Secure/Multipurpose Internet Mail Extensions (S/MIME) mail. S/MIME is a standard for public key encryption and signing of e-mail encapsulated in MIME.

The certificate system 120 may be one or more machines including one or more server computers, gateways or other computing systems. In one embodiment, the certificate system 120 resides on multiple servers, including a certificate authority (CA) server that hosts the certificate manager 125, and another server that hosts the TPS 126. The client 102 and the TPS client 103 can interact with the certificate system 120 via the network 101. Certificate authorities (CAs) validate identities and issue certificates. CAs can be either independent third parties or organizations running their own certificate-issuing server software, such as a certificate system. It should be noted that various other network configurations can be used including, for example, hosted configuration, distributed configurations, centralized configurations, etc.

In one embodiment, the certificate system 120 includes various certificate system subsystems, including a key recovery authority 121, sometimes called a data recovery manager (DRM), an online certificate status responder (OCSP) 122, a directory server 123, the TKS 124, the certificate manager 125, and the TPS 126.

The certificate manager 125 may operate as a CA that can issue, renew, revoke, and publish a wide variety of certificates, for servers, for users, for routers, for other subsystems, and for file or object signing. The certificate manager 125 can be implemented as software, hardware, firmware or any combination of the above. The certificate manager 125 is the core of a CA's PKI. The PKI is a set of hardware, software, people, policies, and procedures needed to create, manage, distribute, use, renew, and revoke digital certificates. The certificate manager 125 can also compile and publish certificate revocation lists (CRLs). The certificate manager 125, which is sometimes referred to as the CA server, can establish and maintain relationships between other subsystems of the certificate system 120.

Like the certificate manager 125, the TPS 126 can establish and maintain relationships between the other subsystems of the certificate system 120. Various operations of the TPS 126 are described in more detail below with respect to FIGS. 2A-4.

Certificates are created based on a specific and unique key pair. If a private key is ever lost, then the data which that key was used to access (such as encrypted emails) is also lost because it is inaccessible. The DRM 121 stores key pairs, so that a new, identical certificate can be generated based on recovered keys, and all the encrypted data can be accessed even after a private key is lost or damaged.

The OCSP 122 verifies whether a certificate is valid and not revoked. This function can also be done by the certificate manager 125 having an internal OCSP service, but using an external OCSP eases the load on the issuing CA (certificate manager 125).

The TKS 124 is used to generate key pairs for the certificates. The TKS 124 derives keys based on the token identifier information and/or private information, and a defined algorithm. These derived keys are used by the TPS 126 to format tokens and enroll or process certificates on the token. The TPS 126 interacts directly with external tokens, like the smart card 105, and manages the keys and certificates on those tokens through the ESC 110. The ESC contacts the TPS 126 when there is a token operation, and the TPS 126 interacts with the certificate manager 125, DRM 121, or TKS 124, as required, then sends the information back to the token via the ESC 110.

In the depicted embodiment, the TPS 126 also can interact with the TPS client 103. In one embodiment, the TPS client 103 provides web browsing capabilities to render images, documents, etc., in a web browser using uniform resource locators (URLs) or links specified by a user (e.g., by activating a link). The web browser allows a user to access a GUI provided by the TPS 126. The GUI may present to the TPS client service pages (e.g., HTML-based service pages) based on the role-based access control managed by the TPS 126. The GUI allows the TPS user access to token-related entries 152 of a token database 150 stored in a data storage device 140 to perform an operation, such as search, view, modify, add, delete, or the like, when the TPS user belongs to the appropriate group and has the appropriate role within the group. The TPS 126 can look up the TPS user in a user-related entry 154, which is stored within the token database 150 to determine the token profile(s) assigned to the TPS user and the corresponding role within each token profile assigned to the TPS user.

In the depicted embodiment, the TPS 126 communicates with the token database 150 via the directory server 123. In one embodiment, the token database 150 stores token-related entries 152, and the user-related entries 154. Alternatively, these entries may be stored as separate databases in the same storage device or in separate storage devices. Alternatively, the token database 150 may be an internal database that is managed by the certificate manager 125. The token-related entries 152 may include token data regarding the tokens, certificates associated with the tokens, and/or activities associated with the tokens. In other embodiments, the token-related entries 152 may also contain other information, such as, for example, enrollment information, the certificate's public key, subject DN, and/or the certificate's extension, status information of the token, the validity period of the certificate and the grace period for renewing the certificate, which is the time before and after the expiration date when renewal is allowed, or the like. The user-related entries 154 may include information pertaining to the TPS user, such as the token profiles assigned to the TPS user, the roles assigned to the particular user for each of the token profiles, or the like.

In one embodiment, the data storage device 140 is a Lightweight Directory Access Protocol (LDAP) repository, and the directory server 123 is a LDAP directory server that manages LDAP entries stored in the LDAP repository. The LDAP directory organizes information in a hierarchal manner using directories. These directories can store a variety of information and can enable access to the information from any machine on the LDAP-enabled network. In other embodiments, the certificate system 120 can implement the token database 150 using various types of database technologies other than LDAP.

In one embodiment, the TPS 126 includes the per-group role-based access control module 127 whose operations are described in detail with respect to FIGS. 2A and 3A-C. In another embodiment, the TPS 126 includes the profile-based access control module 128 whose operations are described in detail with respect to FIGS. 2B and 4A-4C. In another embodiment, the TPS 126 includes both the per-group role-based access control module 127 and the profile-based access control module 128 as depicted in FIG. 1.

Figure 2A:
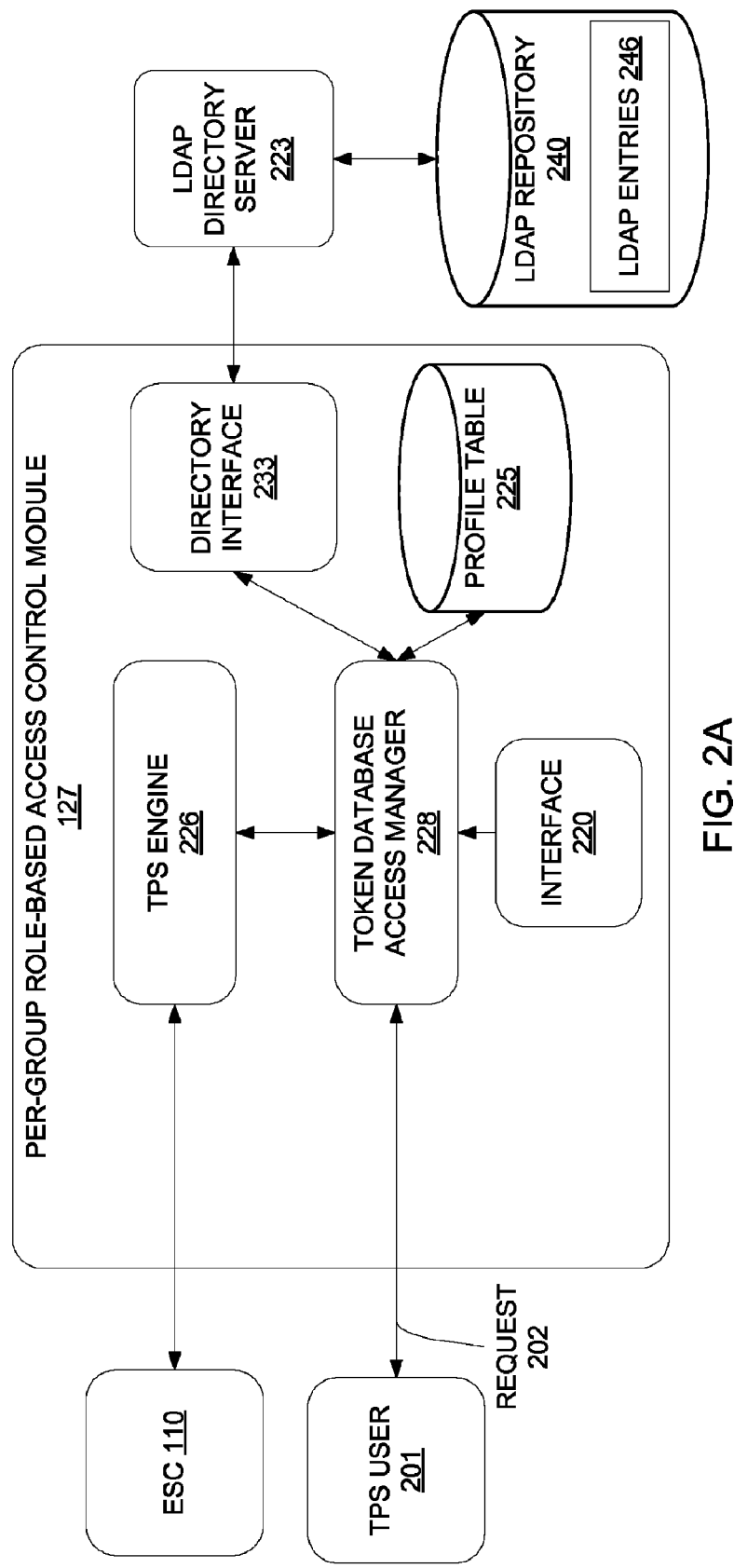
FIG. 2A is a block diagram of one embodiment of the per-group role-based access control module of FIG. 1 that controls access to token data according to token profiles.

FIG. 2A is a block diagram of one embodiment of the per-group role-based access control module 226 of FIG. 1 that controls access to token data according to token profiles. The per-group role-based access control module 127 includes an interface 220, a TPS engine 226, a token database access manager 228, a directory interface 233, and a profile table 225. The TPS engine 226 communicates token operations between the ESC 110 and other subsystems of the certificate system 120, for example, the certificate manager 125, TKS 124, DRM 121, or the like. The TPS engine 226 interacts directly with tokens, like the smart card token 105, and manages the keys and certificates on those tokens through the ESC 110, such as to format tokens, enroll or process certificates on the tokens, or the like. The ESC 110 contacts the TPS engine 226 when there is a token operation, and the TPS engine 226 interacts with the certificate manager 125, DRM 121, or TKS 124, as required, then sends the information back to the token via the ESC 110. The TPS engine 226 can also interact with the token database access manager 228 to retrieve record information pertaining to the token, which is stored, for example, in LDAP entries 246 of the LDAP repository 240. The token database access manager 228 accesses the LDAP directory server 223, which manages the LDAP directory, via the directory interface 233. The LDAP directory may store LDAP entries 246, which may be the token-related entries 152 that store token data, as well as user-related entries 154 that store the TPS user's profile(s) that define to which groups the TPS user 201 belongs, and the corresponding role for each of the assigned profiles. The token database access manager 228 can access token profile records stored in the profile table 225. The profile table 225 stores the available token profiles, where each token profile specifies a token group and a corresponding role for access privileges to entries corresponding to the token group. As described below with respect to FIG. 3A, the roles can be defined and associated with one of the available token profiles and stored in the token profile records of the profile tables 225. The token profile records of the profile table 225 can be setup at installation, for example, in response to input received from an administrator. Alternatively, the token profile records can be created and/or modified after installation, for example, by the administrator.

In one embodiment, the token database access manager 228 associates tokens to multiple groups based on identification numbers. For example, the token database access manager 228 may assign each of the groups a set (e.g., a range) of identification numbers, where each identification number corresponds to a unique token. The token identification numbers may be card unique identifiers (CUIDs) of smart cards, Answer-to-Reset (ATR) manufacturing identifiers for batches of smart cards, or other identifiers used to uniquely identify the tokens. For example, a first batch of smart cards, having a sequential set of CUIDs, can be assigned to a first group, and a second batch, having another sequential set of CUIDs, can be assigned to a second group. Alternatively, the first batch can be assigned to the first group using a first ATR manufacturing identifier, and the second batch can be assigned to the second group using a second ATR manufacturing identifier. For example, the token database access manager 228 may assign the TPS user 201 a first role for the token profile for the first group, and a second role for the token profile of the second group, where the first and second roles define access privileges for the TPS user 201 in each of the first and second groups. In one embodiment, the first role has different access privileges than the second role. In another embodiment, the first and second roles have the same access privileges. In one embodiment, the token database access manager 228 associates the tokens with the multiple groups by adding a group identifier (ID) attribute to each of the LDAP entries 246 corresponding to the tokens of each of the respective groups. The group ID attribute identifies the group to which the token belongs, and each group has different group ID attributes.

In one embodiment, the token database access manager 228 creates a default top-level group having at least one role that is an administrator role that allows a TPS user, which has been assigned the administrator role, to create a new group, to list all groups, and/or to create other TPS users in any of these groups. In one embodiment, tokens that are registered in the token database without any group designation are automatically entered into this top-level group. For migration purposes, if the customer does not want to use multiple groups, all tokens, users, etc., may be populated in this top-level group.

In one embodiment, the administrator of the top-level group can access these token profile records via the token database access manager 228 when assigning the TPS user the corresponding token profiles, as described below with respect to FIG. 3B. As described above, each token profile specifies a token group and a corresponding role within the respective token group. The token database access manager 228 can associate a TPS user to multiple token groups, and, for each group the TPS user belongs, the token database access manager 228 determines a corresponding role for each of the assigned groups. The role defines the TPS user's access privileges to the LDAP entries 246 of the token database corresponding to the respective group. For example, in one embodiment, a first role grants read-only permissions to view and search the LDAP entries 246 of the respective group, the second role grants read and write permissions to view, search, and modify the LDAP entries 246 of the respective group, and a third role grants permissions to view, search and modify the LDAP entries 246 of the respective group, permissions to add a token to the respective group, permissions to delete a token from the respective group, permissions to add, modify, and delete one or more TPS users associated with the respective group. In another embodiment, the token database access manager 228 can also grant permissions to access, and possibly modify the certificates associated with the tokens, activities for the tokens of the respective group, or the like. In another embodiment, the token database access manager 228 defines multiple predefined roles for each profile, where each predefined role defines predefined access privileges to the LDAP entries 246 for the respective group as described below with respect to the profile-based access control module 128.

In one embodiment, the token database access manager 228 assigns the token profiles to the TPS user by storing a user-related entry for the TPS user in the token database with the assigned token profiles, as described below with respect to FIG. 3B. In another embodiment, the token database access manager 228 assigns the TPS user 201 the token profile by adding a token profile ID attribute to each of the LDAP entries 246 corresponding to the tokens of the group, and adding an auxiliary class (e.g., tpsProfile) with a multi-value attribute that can be attached to a user-related entry in the token database to identify that the TPS user 201 belongs to the particular group and has a particular role. For example, the auxiliary class can be attached to an organization object of the directory (e.g., ou=foo, ou=groups). In this embodiment, when requested by the TPS user 201, the token database access manager 228 lists the LDAP entries 246 of the token database for each of the groups for which the token profile ID of the TPS user 201 matches a set of token profile IDs permitted by each of the groups.

In one embodiment, during operation, the token database access manager 228 receives a request from the TPS user 201 to access the token database, and the token database access manager 228 authenticates the TPS user 201, and determines token profiles of the TPS user 201 to determine the TPS user's access privileges to the LDAP entries 246. For example, in one embodiment, the TPS user 201 uses a web browser to access a GUI (interface 220), provided by the token database access manager 228, to request operations to be performed on the LDAP entries 246.

Figure 6:
FIG. 6 illustrates an exemplary web page presented to a user by the token database access manager of FIG. 2A containing a TPS services menu according to one embodiment.

In one embodiment, the token database manager 228 can present the user interface 220 to the TPS user 201, such as a web page illustrated in FIG. 6, in response to determining which token groups the TPS user 201 belongs and the corresponding role within those groups using the token profiles. FIG. 6 illustrates an exemplary web page 600 presented to a user by the token database access manager of FIG. 2A containing a TPS services menu 602 according to one embodiment. In one embodiment, the TPS services menu 602 presents only a list of permitted operations available to the TPS user 201 based on the token profiles associated with the TPS user 201. In the depicted embodiment, the TPS user 201 is permitted various operations, including token-related operations and user-related entries, such as list/search tokens, add new tokens, add users, list users, search users, and list/search activities. In other embodiments, the TPS user 201 may have more or less operations than presented in the menu 602, such as operations to modify tokens in the token groups for which the TPS user 201 belongs.

Figure 2B:
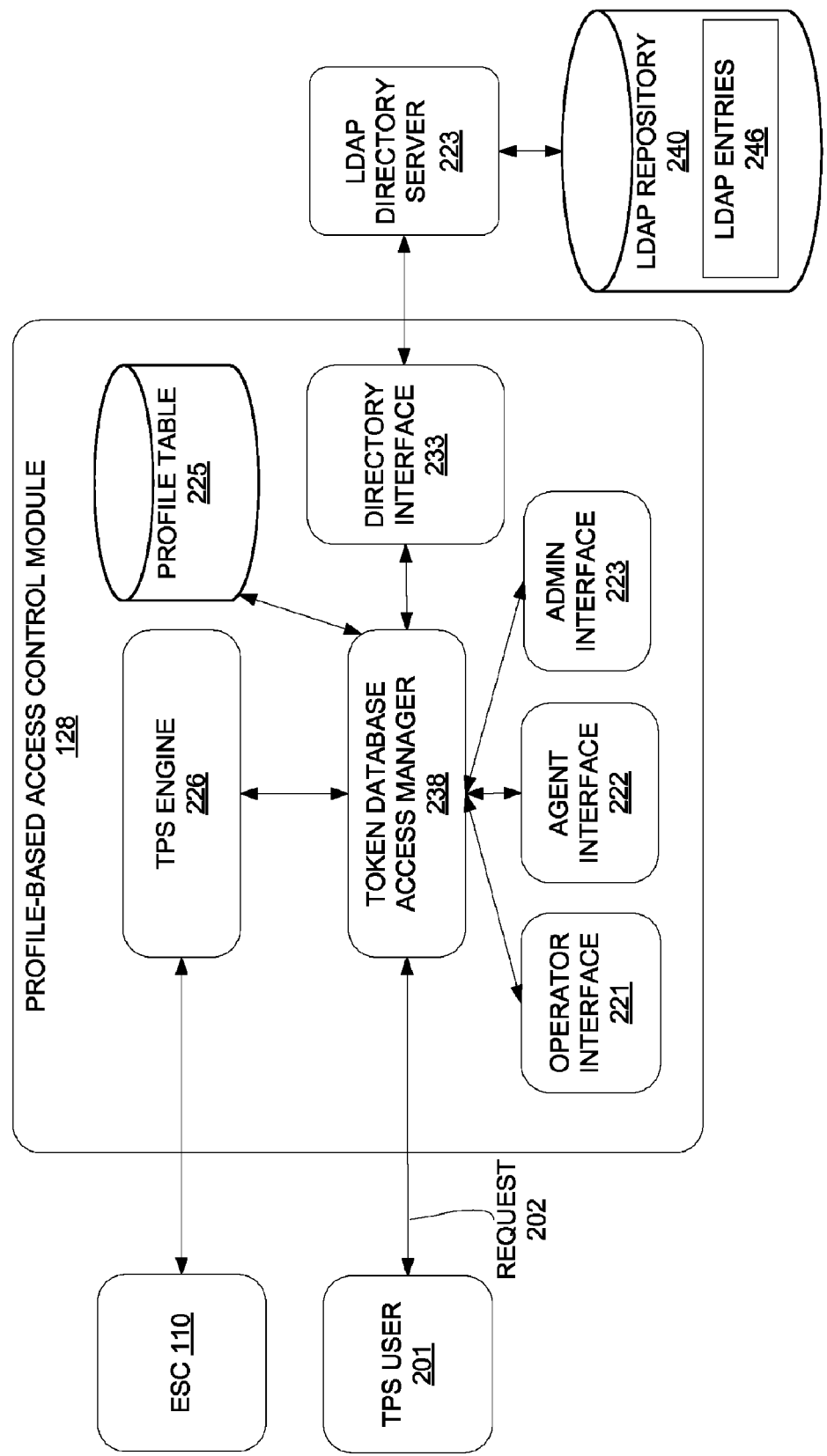
FIG. 2B is a block diagram of one embodiment of the profile-based access control module of FIG. 1 that controls access to token data according to token profiles having predefined roles.

FIG. 2B is a block diagram of one embodiment of the profile-based access control module 128 of FIG. 1 that controls access to token data according to token profiles having predefined roles. The profile-based access control module 128 is similar to the per-group role-based access control module 127 as noted by similar reference numbers, such as the TPS engine 226, the directory interface 233, and the profile table 225. The profile table 225 stores the token profiles with predefined roles. The profile-based access control module 128 also includes an operator interface 221, an agent interface 222, an administrator interface 223, and a token database access manager 238. The token database access manager 238, like the token database access manager 228, accesses the LDAP directory server 223 via the directory interface 233. In this embodiment, however, the user-related entries of the token database store the TPS user's profile(s) that defines the groups to which the TPS user 201 belongs, and, for each group, one or more of the predefined roles: operator, agent, and administrator.

In one embodiment, during operation, the token database access manager 238 receives a request from the TPS user 201 to access the token database, and the token database access manager 228 authenticates the TPS user 201, and determines the token profile of the TPS user 201 to determine the TPS user's access privileges to the LDAP entries 246. After determining the TPS user's predefined role using the token profile, the token database access manager 238 can present the appropriate interface 221, 222, and/or 223, to the TPS user 201 depending on the roles defined in the token policy. The token database access manager 238 receives a request from the TPS user 201 to perform an operation, for example, in response to the TPS user 201 selecting one of the permitted operations in the respective interface. The agent interface 222 is used to manage communications between the TPS user 201 and the token database access manager 238. The agent interface 222 may be in the form of web pages, referred to herein as agent service pages. The agent service pages are used to perform token management operations, such as, for example, setting the token status and changing token policies. In one embodiment, these service pages are HTML-based. The operator interface 221 is used to manage communications between the TPS user 201 and the token database access manager 238. The operator interface 221 may also be in the form of web pages, referred to herein as operator service pages. The operator service pages are used to perform token monitoring operations, such as viewing tokens, certificate, and activities performed through the token database access manager 238.

The administrative interface 223 is used to manage users for the TPS 126 and may have limited control over tokens. The administrator operations may include adding TPS users, modifying TPS users, and deleting TPS users. Administrators may also view tokens, certificates, and activities for the groups to which they belong. The administrators may view slightly more activities than the agents or operators because they can view both token-related entries 152 and user-related entries 154. In one embodiment, the administrator interface 223 is implemented as HTML-based service pages. Alternatively, the administrator interface 223 may be implemented as a Java-based or HTML-based administrative console that uses a server ULR and the administrative port number.

In one embodiment, the operator has read-only permission and the operator interface 221 presents the following exemplary menu:

Tokens
List Tokens
Search Tokens
Certificates
List Certificates
Search Certificates
Activities
List Activities
Search Activities The agent has read/write permissions and the agent interface 222 presents the following exemplary menu to the TPS user 201:

```
Tokens
List Tokens
Search Tokens
# Add New Token
Certificates
List Certificates
Search Certificates
Activities
List Activities
Search Activities
```

In one embodiment, the agent and operator interfaces 222 and 221 share the same user interface except for differences in the access privileges; operators can read/search and not modify, while agents can read/search and modify.

In one embodiment, the administrator has various permissions and the administrator interface 223 presents the following exemplary menu to the TPS user 201:

```
Tokens:
# List Tokens
Search Tokens
Users:
# Add User -- will require userid, groupid, first name, last name, cert
    textbox, role(s) (operator, agent or admin) The groupid will be a
    drop down box of the possible groups (for which the admin is a user).
    There will be at least one top group - the top level group - if no
    other groups are defined.
    Initial validation will check that none of the fields are empty. For
    admins in the top level group, all possible groups will be selectable.
    Validation will be done to confirm that the userid is unique globally
    under ou=People, and if so, the user will be created with uid=userid,
    cn = first last, sn last, usercert=cert, Roles will be defined by
    creating uniqueMember entries in each subgroup of the group.
# List Users -- will list the users in the group(s) the admin belongs
    and has admin priviledges.
# Search Users -- search -- restricted to those groups admin has
    admin privileges. As with tokens and certs, each user record will
    have a button allowing one to edit/update or delete the user. The
    user record will display userid, first and last name , usercert,
    groups which user belongs to (and roles). The groups and roles
    that can be changed will be changeable -- otherwise they will be
    greyed out. For the delete case, the user will be deleted from all
    groups for which the admin has permissions, If he is a member of
    no other group, then the user entry will be deleted. For a top level
    admin, the user will simply be deleted.
Groups: (only visible/available to top-level admins)
# Add Group: will require groupID, description. Will be validated for
    uniqueness under ou=groups. Will create organizationalUnit under
    ou=groups with ou=groupId, description = description. Will also
    create the subgroups (Admins, Officers, Agents)
# List Groups: Will list all groups.
# Search Groups:
    As above, each group entry will list group and description and
    ability to update description. Delete will delete the group. It will
    not however delete the group members. The group entry will also
    list all the group members (and their roles)
```

Alternatively, the interfaces 221-223 may present other menus according to the configuration of the predefined roles and the predefined access privileges for each predefined role.

Figure 7A:
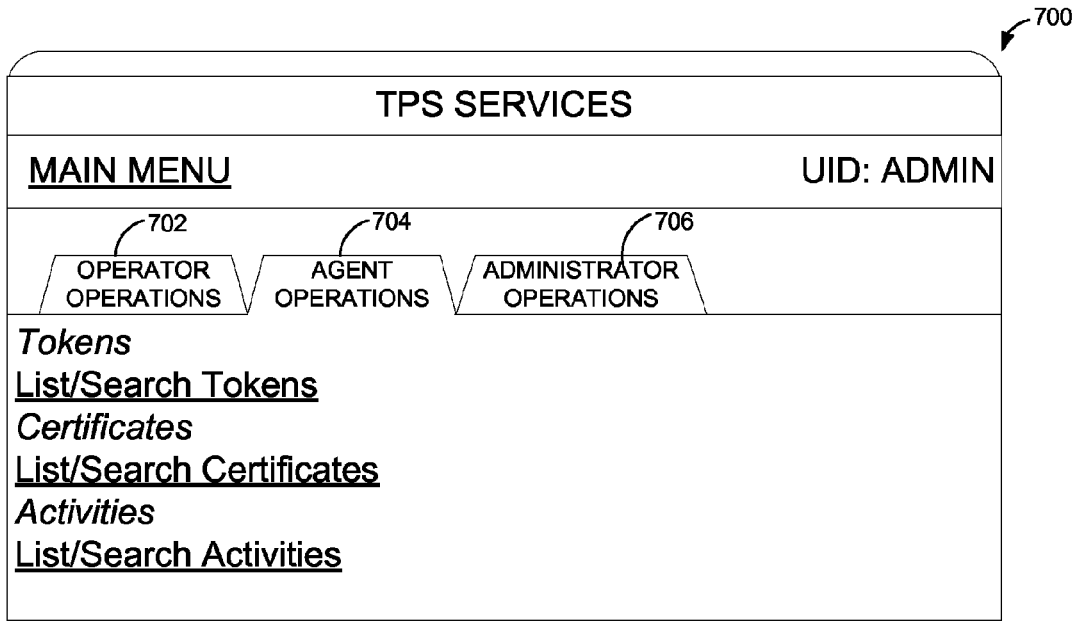
FIG. 7A illustrates an exemplary web page presented to a user by the token database access manager of FIG. 2B containing a TPS services menu when an agent tab is selected according to one embodiment.
Figure 7B:
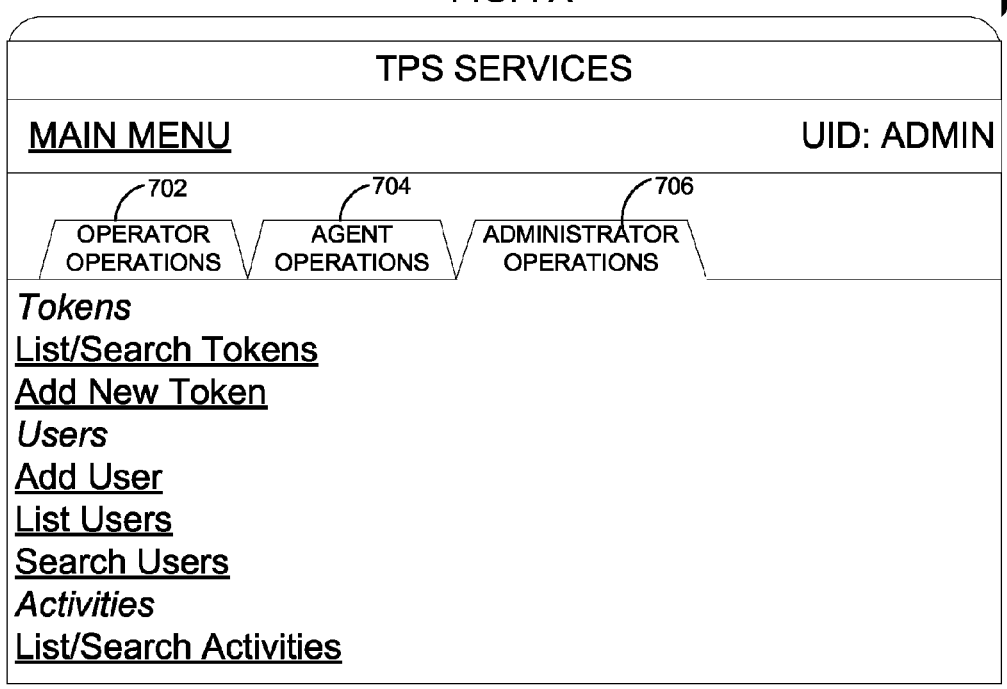
FIG. 7B illustrates the exemplary web page of FIG. 7A when the administrator tab is selected according to one embodiment.

In one embodiment, each of the roles' task pages is accessed through a tab at the top of the TPS pages, such as illustrated in FIGS. 7A and 7B. FIG. 7A illustrates an exemplary web page presented to a user by the token database access manager 238 containing a TPS services menu according to one embodiment. In one embodiment, a tab is only visible if the TPS user 201 who is logged into the TPS service page belongs to that role. It is possible for a user to belong to more than one role, such as illustrated in FIG. 7A by the default administrator user, which belongs to all three predefined roles. In particular the TPS services web page 700 includes a first tab 702 for the operator operations, a second tab 704 for agent operations, and a third tab 706 for administrator operations. FIG. 7A illustrates when the second tab 704 for agent operations is selected, and FIG. 7B illustrates the web page when the third tab 706 for administrator operations is selected.

In one embodiment, the TPS service pages manage four areas of LDAP entries 246: 1) token data; 2) certificates issued to tokens; 3) activities performed on the tokens, such as creating tokens or users or modifying entries; and 4) TPS subsystem users. In this embodiment, the TPS operators can view any token-related entries (meaning token data, certificates, and activities), but they cannot modify them. The TPS agents can both view and modify token data (both for policies and status) and view certificates and activities. The TPS administrators can view tokens and certificates, can add and delete tokens, and can add, modify, and delete TPS users, such as illustrated in FIG. 7C.

FIG. 7C illustrates an exemplary web page 750 presented to a user by the token database access manager 238 to add a new TPS user according to one embodiment. The web page 750 allows the administrator to add a user ID, the user's first and last names, the roles 752 of the new user, and the certificate. After inputting the appropriate information, the administrator sends the request to the TPS 126, for example, by activating the add user button 754 on the web page 750.

In one embodiment, the token database access manager 238 defines a default top-level group. For example, upon initial installation, the token database access manager 238 can create the top-level group and assign a user to be an operator, an agent, and administrator in the top-level group, as shown by the following exemplary data structure.

```
ou = PKI_TOP_GROUP, ou = groups, $basedn (organizational Unit)
cn = TUS Agents, ou =PKI_TOP_GROUP, ou = groups,
$basedn (groupOfUniqueNames)
cn = TUS Officers, ou =PKI_TOP_GROUP, ou = groups, $basedn
(groupOfUniqueNames)
cn = TUS Administrators, ou =PKI_TOP_GROUP, ou = groups,
$basedn (groupOfUniqueNames)
```

In one embodiment, this data structure may be used for other groups to define the users in the ou=People substree and to have references as uniqueMembers as above. Gaining certain access privileges in a group can be done with the TPS user having an uniqueMember reference in the right group list of each group.

In one embodiment, the token database access manager 238 associates the tokens into the groups, and for each group, assigns three predefined roles: operators (also referred to as officers), agents, and administrators. In another embodiment, the token database access manager 238 may also assign a single user (e.g., uid=admin) to have all of the predefined roles, such as described above with respect to the top-level group.

FIG. 3A is a flow diagram of one embodiment of a method of defining token profiles for per-group role-based access control. The methods 300, 350, and 370 are performed by processing logic that may comprise hardware (circuitry, dedicated logic, etc.), software (such as is run on a general purpose computer system or a dedicated machine), firmware (embedded software), or any combination thereof. In one embodiment, the methods 300, 350, and 370 are performed by the per-group role-based access control module 127 of FIGS. 1 and 2A.

Referring to FIG. 3A, processing logic begins with associating multiple tokens to multiple token groups (block 302), for example, by assigning group IDs to the tokens of the respective group. For each group, the processing logic defines multiple roles for the respective group, where each role defines the access privileges to the entries corresponding to tokens in the respective group (block 304). The processing logic associates a token profile for each defined role (block 306), and stores the token profiles as token profile records in the profile table (block 308). For example, the processing logic can associate each token profile to each of the roles of for each of the groups using profile IDs (e.g., profile ID1 for role 1 of group 1, profile ID2 for role 2 of group 1, profile ID3 for role 1 of group 2, and profile ID4 for role 2 of group 2). The method 300 may be performed as a one-time operation, such as, for example, upon installation of the TPS, or upon initial setup of the token database. Alternatively, the method 300 may be performed to update the token profile records in the profile table. The method 300 may be performed in response to input from an administrator that has access privileges to associate tokens with groups, define the roles, and associate the roles with particular token profiles.

In one embodiment, the processing logic at block 302 associates the tokens to the group by adding a set of token identification numbers, each token identification number corresponding to one of the tokens of the group. The token identification numbers may be CUIDs of a set of smart cards, ATR manufacturing identifiers, or other identifiers used to uniquely identify the tokens of the group.

In another embodiment, the processing logic at block 302 associates the tokens to the group by adding a group identifier (ID) attribute to each token-related entry of the token database corresponding to the tokens of the group. In another embodiment, the processing logic adds the group ID to each token-related entry of the token database corresponding to the certificates of each of the tokens of the group, and/or to each token-related entry of the token database corresponding to activities associated with each of the tokens of the group. In another embodiment, the processing logic adds an attribute to each entry of the appropriate database tables, such as a token table, a token certificate table, and a token activity table.

FIG. 3B is a flow diagram of one embodiment of a method 350 of assigning a token profile to the TPS user for each group the TPS user belongs for the per-group role-based access control. In FIG. 3B, processing logic begins with associating a TPS user with the multiple token groups (block 352), and for each group the TPS user belongs, the processing logic determines a corresponding role for the TPS user (block 354). This may be done in response to input received from an administrator that selects one or more of the available defined roles stored in the profile table. For each group the TPS user belongs, the processing logic assigns the TPS user the corresponding token profile based on the profile table (block 356). For example, the processing logic can assign a profile ID to the TPS user for each of the groups to which the TPS user belongs. The processing logic stores a user-related entry for the TPS user in the token database with the assigned token profiles (block 358). The method 350 may be performed as a one-time operation, such as, for example, upon installation of the TPS, or upon initial setup of the token database. Alternatively, the method 350 may be performed multiple times to create and update TPS users after installation, such as when a new TPS user is added or deleted from one of the token groups. The method 350 may be performed in response to input from an administrator that has access privileges to associate a TPS user to multiple groups and to assign the corresponding token profiles to the TPS user.

In one embodiment, the processing logic at block 356 assigns each TPS user the token profile by adding a token profile ID attribute to the user-related entry of the token database corresponding to the TPS user. When requested by the TPS user, the processing logic lists tokens stored in the token database for which the token profile ID matches a set of token profile IDs permitted by the group of which the TPS user belongs. In another embodiment, the processing logic at block 356 assigns each TPS user the token profile by adding an auxiliary class (e.g., tpsProfile) with a multi-valued attribute token profile ID that can be attached to an organization object of a directory (e.g., ou=foo, ou=groups).

Figure 3C:
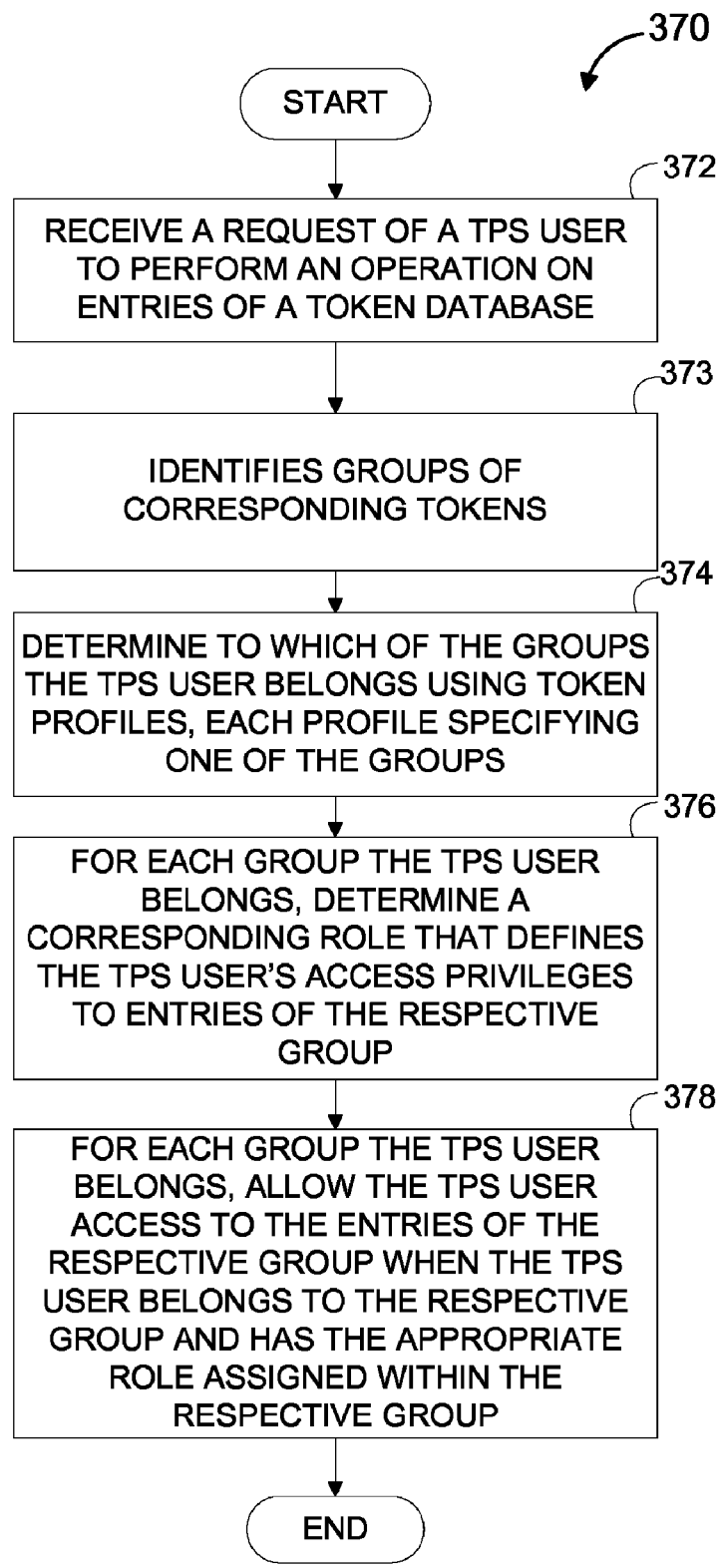
FIG. 3C is a flow diagram of one embodiment of a method of managing role-based access control using the assigned token profiles for the per-group role-based access control.

FIG. 3C is a flow diagram of one embodiment of a method 370 of managing role-based access control using the assigned token profiles for the per-group role-based access control. In FIG. 3C, during operation, the processing logic receives a request from the TPS user to perform an operation on at least one of the entries (block 372), such as one of the token-related entries containing token data, certificates associated with the tokens, activities associated with the tokens, or the user-related entries. For entries indicated in the request, processing logic identifies groups of corresponding tokens (block 373). The processing logic then determines to which of the groups the TPS user belongs (block 374). In one embodiment, processing logic makes this determination using token profiles assigned to the user, where each token profile specifies one of the groups. Alternatively, a user may be assigned multiple role identifiers, with each role identifier being associated with a respective group, and processing logic may determine to which of the groups the TPS user belongs using the role identifiers assigned to the TPS user.

Next, for each group the TPS user belongs, the processing logic determines a corresponding role that defines the TPS user's access privileges to entries of the respective group (block 376). For each group the TPS user belongs, the processing logic allows the TPS user access to the entries of the respective group to perform the operation when the TPS user has the appropriate role assigned within the respective group (block 378).

In these embodiments, there may be any number of roles defined for each of the profiles, each role defining different access privileges to the entries of the respective group. For example, in one embodiment, the processing logic defines three roles, including 1) a first role that allows a TPS user having been assigned the particular role to view and search any token-related entries of the token database associated with the certificate system, but not modify any of the token-related entries; 2) a second role that allows a TPS user having been assigned the particular role to view, search, and modify any of the token-related entries of the token database; and 3) a third role that allows a TPS user having been assigned the particular role to view, search and modify any of the token-related entries and view, search, and modify any user-event entries of the token database.

In another embodiment, the processing logic defines a top-level group, and the administrator role within the top-level group that allows the administrator to create a new group, list all groups, and/or create other TPS users in any of these groups as described above.

In another embodiment, the roles for each of the groups are predefined roles, each role having predefined access to the tokens of the respective group. In one embodiment, the predefined roles are an operator role, an agent role, and an administrator role, as described below with respect to FIGS. 4A-4C.

Figures 4A, 4B:
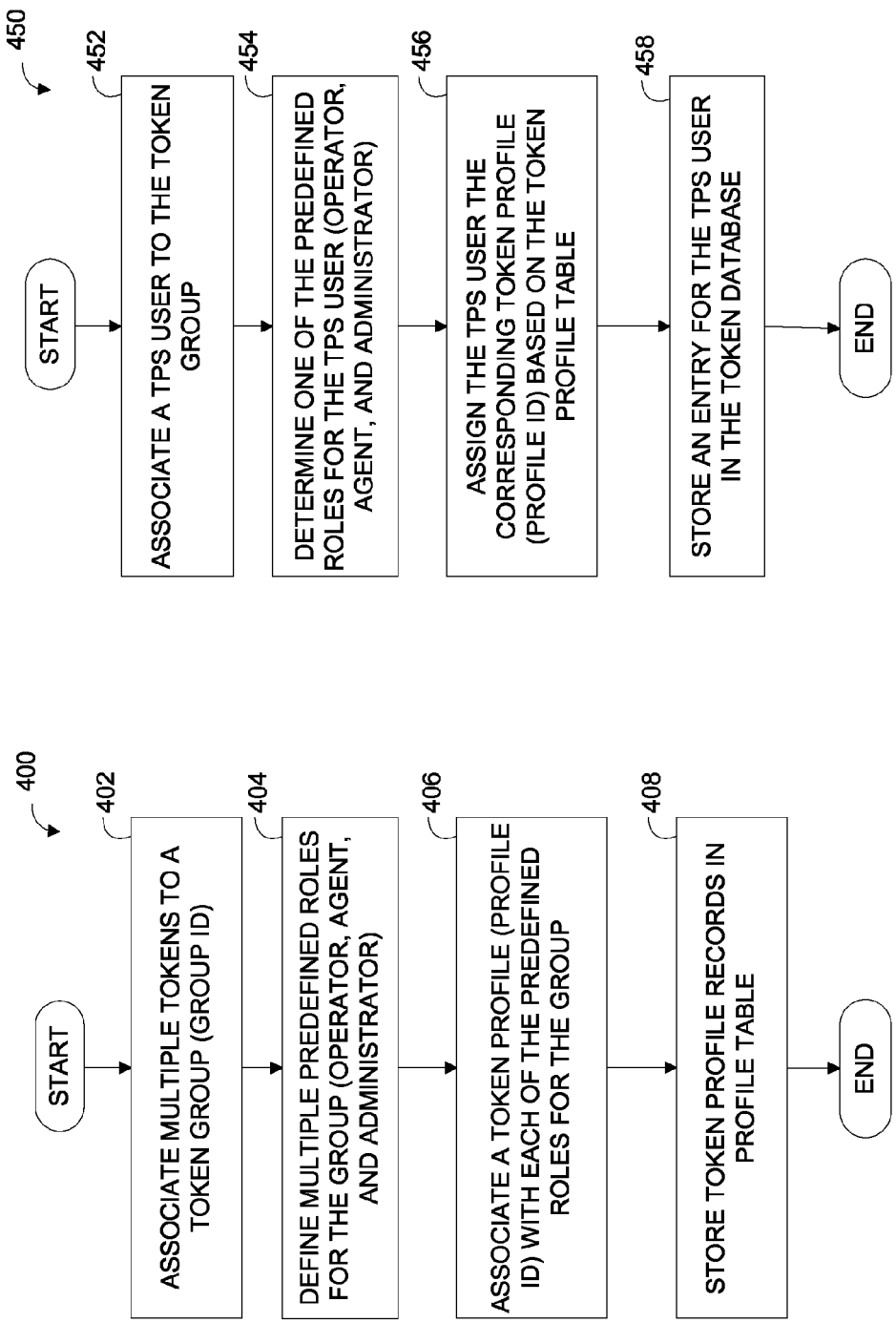
FIG. 4A is a flow diagram of another embodiment of a method of defining token profiles for profile-based access control.
FIG. 4B is a flow diagram of one embodiment of a method of assigning a token profile to the TPS user for the group for the profile-based access control.
Figure 4C:
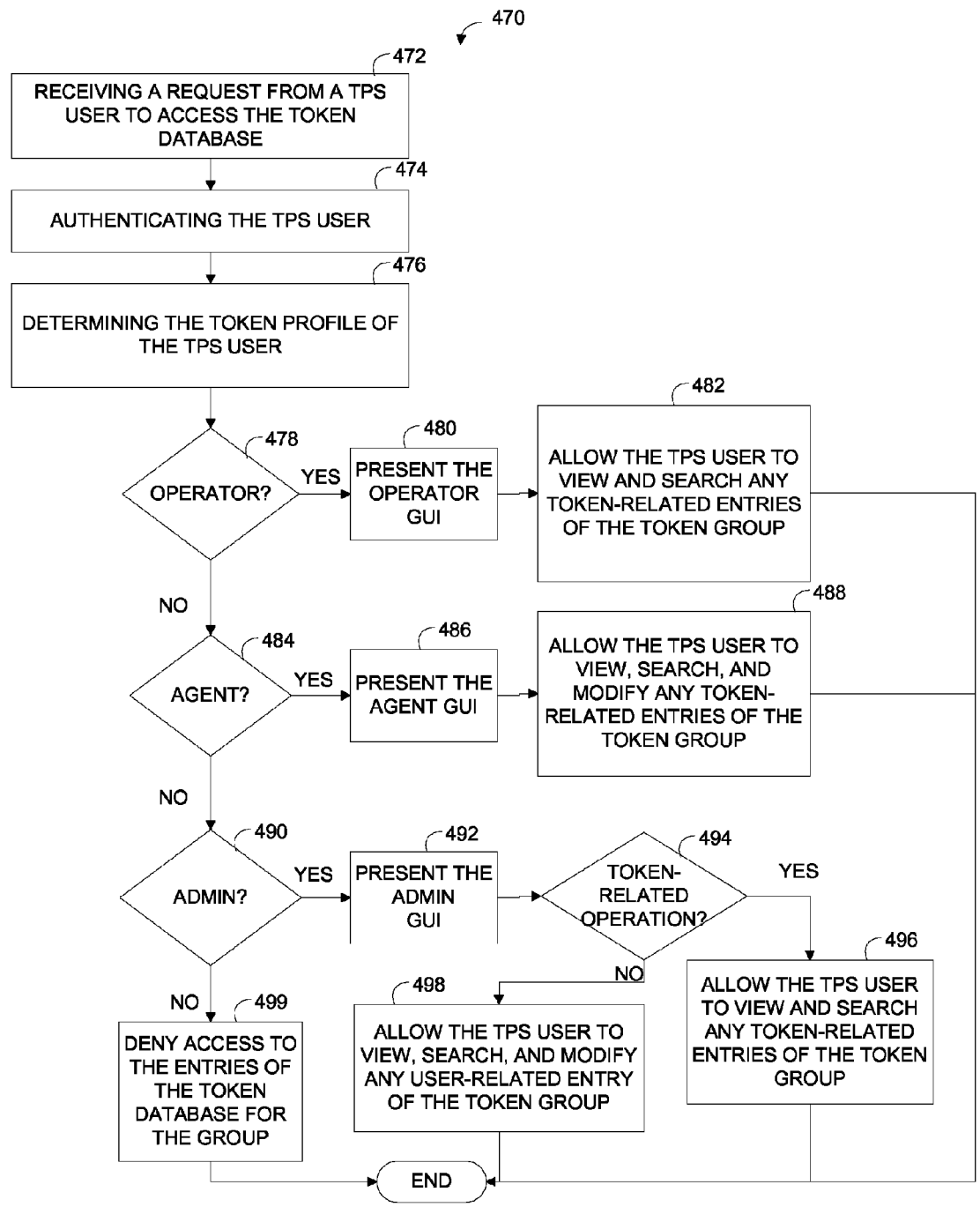
FIG. 4C is a flow diagram of one embodiment of a method of managing role-based access control using the assigned token profile for the profile-based access control.

FIGS. 4A-4C are flow diagrams of various embodiments of operations of methods 400, 450, and 470 performed by the token database access manager 238. The methods 400, 450, and 470 are performed by processing logic that may comprise hardware (circuitry, dedicated logic, etc.), software (such as is run on a general purpose computer system or a dedicated machine), firmware (embedded software), or any combination thereof. In one embodiment, the methods 400, 450, and 470 are performed by the profile-based access control module 128 of FIGS. 1 and 2B. Alternatively, the methods 400, 450, and 470 are performed by the token database access manager 238.

FIG. 4A is a flow diagram of another embodiment of a method 400 of defining token profiles for profile-based access control. Referring to FIG. 4A, processing logic begins with associating multiple tokens to multiple a token group (block 402), for example, by assigning a group ID to the tokens of the group. The processing logic defines multiple predefined roles for the group (operator, agent, and administrator) (block 4040). The processing logic associates a token profile for each of the predefined roles for the group (block 406), and stores the token profiles as token profile records in the profile table (block 408). For example, the processing logic can associate each token profile to each of the predefined roles of the group using a profile ID (e.g., profile ID1 for operator, profile ID2 for agent, and profile ID3 for administrator). The method 400 may be performed as a one-time operation, such as, for example, upon installation of the TPS, or upon initial setup of the token database. The method 400 may be performed in response to input from an administrator that has access privileges to associate tokens with the group, to define the predefined roles for the group, and to associate the predefined roles with particular token profiles.

In one embodiment, the processing logic at block 402 associates the tokens to the multiple groups by adding group identifier (ID) attributes to each token-related entry of the token database corresponding to the tokens of the respective groups. In another embodiment, the processing logic adds the group IDs to each token-related entry of the token database corresponding to the certificates of each of the tokens of the respective groups, and/or to each token-related entry of the token database corresponding to activities associated with each of the tokens of the respective groups. In another embodiment, the processing logic adds an attribute to each entry of the appropriate database tables, such as a token table, a token certificate table, and a token activity table.

In another embodiment, the processing logic at block 402 associates the tokens to the groups by adding a set of token identification numbers to each of the groups, each token identification number corresponding to one of the tokens of the respective group. The token identification numbers may be CUIDs of a set of smart cards, ATR manufacturing identifiers, or other identifiers used to uniquely identify the tokens of the multiple groups.

FIG. 4B is a flow diagram of one embodiment of a method 450 of assigning a token profile to the TPS user for the group for the profile-based access control. In FIG. 4B, processing logic begins with associating a TPS user with the token group (block 452), and determining a predefined role for the TPS user (block 454), such as an operator, an agent, or an administrator. This may be done in response to input received from an administrator that selects one or more of the predefined roles stored in the profile table. The processing logic assigns the TPS user the corresponding token profile based on the profile table (block 456). For example, the processing logic can assign the profile ID corresponding to the predefined role to the TPS user. The processing logic stores a user-related entry for the TPS user in the token database with the assigned token profile (block 458). The method 450 may be performed as a one-time operation, such as, for example, upon installation of the TPS, or upon initial setup of the token database. Alternatively, the method 450 may be performed multiple times to create and update TPS users after installation, such as when a new TPS user is added or deleted from one of the token groups. The method 450 may be performed in response to input from an administrator that has access privileges to associate a TPS user to the predefined roles in the group.

In one embodiment, the processing logic at block 456 assigns each TPS user the token profile by adding a token profile ID attribute, for each group the TPS user belongs, to the user-related entry of the token database corresponding to the TPS user. When requested by the TPS user, the processing logic lists tokens stored in the token database for which the token profile ID matches a set of token profile IDs permitted by each of the groups of which the TPS user belongs. In another embodiment, the processing logic at block 456 assigns each TPS user the token profile by adding an auxiliary class (e.g., tpsProfile) with a multi-valued attribute token profile ID that can be attached to an organization object of a directory (e.g., ou=foo, ou=groups).

FIG. 4C is a flow diagram of one embodiment of a method 470 of managing role-based access control using the assigned token profile for the profile-based access control. In FIG. 4C, during operation, the processing logic receives a request from the TPS user to access the token database (block 472), and the processing logic authenticates the TPS user (block 474). The processing logic determines the token profile of the TPS user (block 476). When the processing logic determines the token profile, the processing logic determines the corresponding group that the TPS user belongs, as well as the corresponding predefined role within the group. The processing logic determines if the TPS user is an operator (block 478). If so, the processing logic presents the operator GUI (block 480), and allows the TPS user to view and search any token-related entries of the token group (block 482). For example, the operator GUI may present the permitted operations to the TPS user, allowing the TPS user to select one of the presented operations. If the TPS user is not an operator at block 478, the processing logic determines if the TPS user is an agent (block 484). If so, the processing logic presents the agent GUI (block 486), and allows the TPS user to view, search, and modify any token-related entries of the token group (block 488). Similarly, the agent GUI may present the permitted operations to the TPS user, allowing the TPS user to select one of the presented operations, such as illustrated in FIG. 7A. If the TPS user is not an agent at block 484, the processing logic determines if the TPS user is an administrator (block 490). If so, the processing logic presents the administrator GUI (block 492). Like the other GUIs, the administrator GUI may present the permitted operations to the TPS user, allowing the TPS user to select one of the presented operations, such as illustrated in FIG. 7B. The processing logic determines if the selected operation is a token-related operation (block 494), meaning the operation is to be performed on token-related entries, instead of user-related entries of the token database. If the operation is a token-related operation, the processing logic allows the TPS user to view and search any token-related entries of the token group (block 496). If the operation is not a token-related operation at block 494, the processing logic allows the TPS user to view, search, and modify any user-related entry of the token group (block 498). If the TPS user is not an administrator at block 490, the processing logic denies access to the entries of the token database for the group (block 499).

In another embodiment, the method 470 is configured to allow the TPS user to be any combination of the operator, agent, and administrator. For example, the TPS user may be assigned to be an agent and an administrator, or an operator and an administrator.

In one embodiment, 1) the predefined access of the operator role allows the TPS user to have read-only permissions to view token-related entries of the group; 2) the predefined access of the agent role allows the TPS user to have read and write permissions to view and modify the token-related entries of the group; and 3) the predefined access of the administrator role allows the TPS user to have read-only permissions to view the token-related entries of the group, permissions to add a token to the plurality of tokens of the group, permissions to delete a token from the plurality of tokens of the group, and permissions to add, modify, and delete one or more other TPS users associated with the group. Alternatively, other combinations of permissions are possible for the predefined roles.

In another embodiment, 1) the predefined access of the operator role further allows the TPS user to have read-only permissions to view and search token data of each of each of the plurality of tokens of the group, certificates associated with the plurality of tokens of the group, and activities for the plurality of tokens of the group; and 2) the predefined access of the agent role further allows the TPS user to have read and write permissions to view, search, and modify the token data, the certificates, and the activities.

In one embodiment, the processing logic receives a request from a TPS user to perform an operation to search or view all, some, or one of the following: the tokens, certificates associated with the tokens, or activities associated with the tokens. When the TPS user is determined to be an operator, agent, or administrator of the group, the processing logic permits access to allow the searching or viewing. In another embodiment, the request is a request to modify all, some, or one the tokens of the group, certificates associated with the tokens, and/or activities associated with the plurality of tokens. When the TPS user is determined to be an operator or administrator of the group, the processing logic prohibits access to the tokens to allow the modifying. When the TPS user is determined to be an agent, the processing logic permits access to allow the modifying.

In one embodiment, the modifying request is a request to modify token data of the token-related entry, such as a username of the user with whom the token is associated and the token policy. When the TPS user is determined to be one of an operator or an administrator of the group, the processing logic prohibits access to the tokens to allow the modifying. When the TPS user is determined to be an agent of the group, the processing logic permits access to allow the modifying. In another embodiment, the modifying request is a request to change a token status of one or more of the tokens in the token-related entries. For example, the token status may indicate that the token is active, the token is physically damaged, the token has been temporarily or permanently lost, the lost token has been found, the lost token cannot be found (i.e., permanently lost), or the token has been terminated. Alternatively, the token status may include other statuses, such as an uninitialized status, which means the token has not been processed; an initialized status, which means the smart card is formatted, but does not have any certificates enrolled on it; an enrolled status, which means the certificates have been installed on the smart card; or a lost or on hold status, which means that the token has been suspended, and any suspended or revoked token may also have an attribute to show the reason why the token status was changed. In another embodiment, the modifying request is a request to set one or more polices for the tokens in the token-related entries. For examples, the one or more policies may allow a user to re-enroll certificates with the same token, allow the token user to initiate a personal identification number (PIN) reset operation, or allow a user to regenerate their existing certificates using the original key and extended validity period.

In another embodiment, the request is to delete one or more of the tokens or to add one or more tokens. When the TPS user is determined to be one of an operator or an agent of the group, the processing logic prohibits access to the tokens to allow the deleting or adding. When the TPS user is determined to be an administrator of the group, the processing logic permits access to allow the deleting or adding.

In another embodiment, the received request is to create or modify TPS users. When the TPS user is determined to be one of an operator or an agent of the group, the processing logic prohibits access to the tokens to allow the creating or modifying. When the TPS user is determined to be an administrator of the group, the processing logic permits access to allow the creating or modifying.

Figure 5:
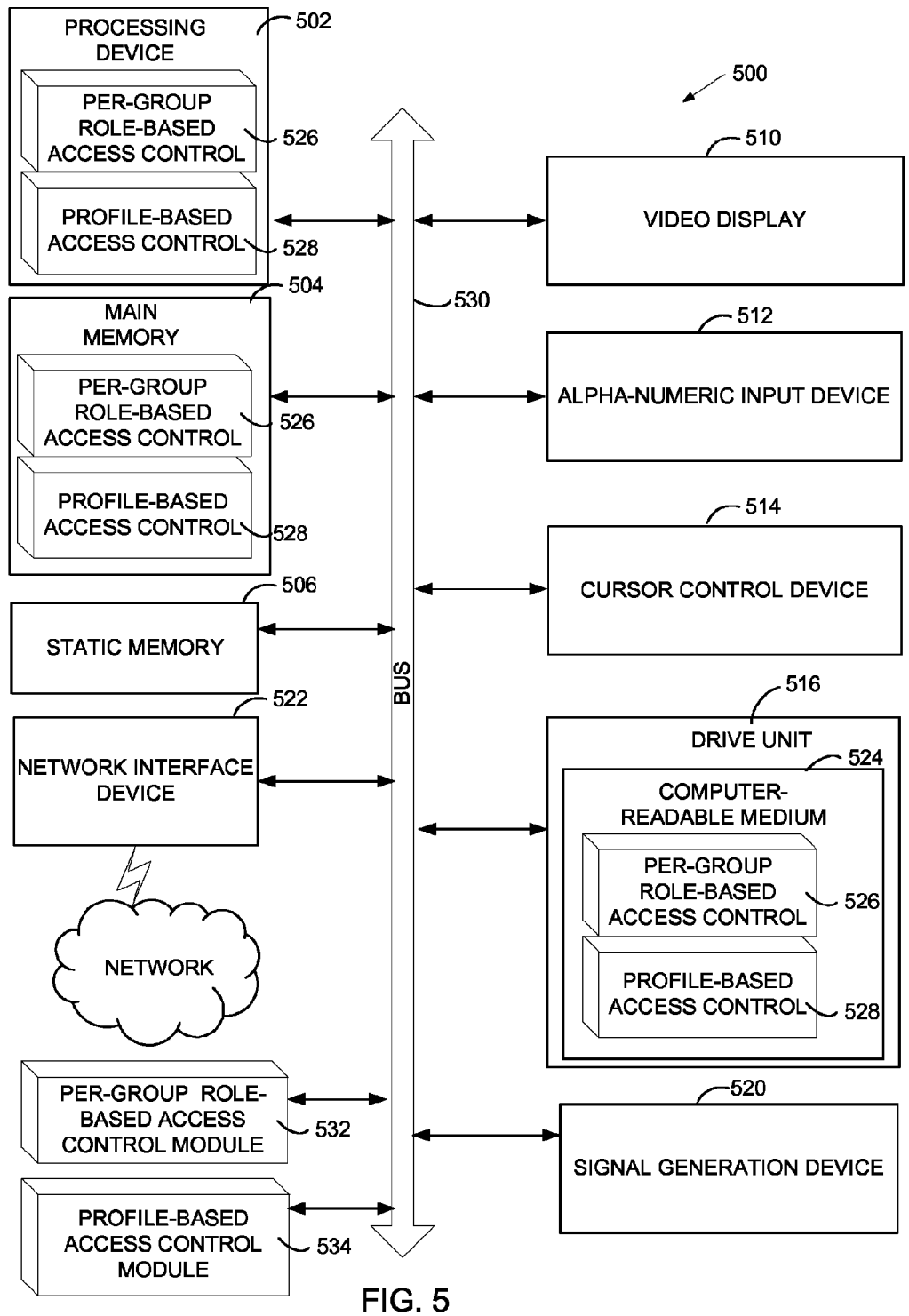
FIG. 5 illustrates a diagrammatic representation of a machine in the exemplary form of a computer system for managing role-based access control of token data.

FIG. 5 illustrates a diagrammatic representation of a machine in the exemplary form of a computer system 500 for managing role-based access control of token data. Within the computer system 500 is a set of instructions for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a STB, a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for operations of the role-based access control using token profiles, such as the methods 300 and 400 described above. In one embodiment, the computer system 500 represents various components that may be implemented in the TPS 126 as described above. Alternatively, the TPS 126 may include more or less components as illustrated in the computer system 500.

The exemplary computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 516, each of which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic (e.g., per-group role-based access control 526 and/or the profile-based access control 528) for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable storage medium 524 on, which is stored one or more sets of instructions (e.g., per-group role-based access control 526 and/or the profile-based access control 528) embodying any one or more of the methodologies or functions described herein. The per-group role-based access control 526 and/or the profile-based access control 528 may also reside, completely or at least partially, within the main memory 504 and/or within the processing device 502 during execution thereof by the computer system 500, the main memory 504 and the processing device 502 also constituting computer-readable storage media. The per-group role-based access control 526 and/or the profile-based access control 528 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The per-group role-based access control module 532, the profile-based access control module 534, and other features described herein (for example in relation to FIGS. 1-4, and 6A-7) can be implemented as discrete hardware components or integrated in the functionality of hardware components such as ASICS, FPGAs, DSPs or similar devices. In addition, the per-group role-based access control module 532 and/or the profile-based access control module 534 can be implemented as firmware or functional circuitry within hardware devices. Further, the per-group role-based access control module 532 and/or the profile-based access control module 534 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
    assigning a token processing system (TPS) client a token profile for a group comprising a plurality of tokens, the token profile stored in a profile data structure, wherein the token profile specifies at least one of a plurality of predefined roles for the TPS client, and wherein each of the plurality of predefined roles is associated with predefined access to entries of a token database;
    receiving, by a TPS executing on a computing system, a request from the TPS client over a network to perform an operation on the entries of the token database that correspond to the group, wherein the TPS is configured to communicate with the token database and configured to communicate over the network with one or more additional clients each having at least one of the plurality of tokens; and
    allowing the TPS client access to the token database to perform the operation when permitted by the predefined roles specified in the token profile on the entries of the token database that correspond to the group identified by the token profile.

2. The method of claim 1, wherein the plurality of predefined roles comprise an operator role, an agent role, and an administrator role, wherein the predefined access of the operator role allows the TPS client to have read-only permissions to view token-related entries of the group, wherein the predefined access of the agent role allows the TPS client to have read and write permissions to view and modify the token-related entries of the group, and wherein the predefined access of the administrator role allows the TPS client to have read-only permissions to view the token-related entries of the group, permissions to add a token to the plurality of tokens of the group, permissions to delete a token from the plurality of tokens of the group, and permissions to add, modify, and delete one or more other TPS clients associated with the group.

3. The method of claim 2, wherein the predefined access of the operator role further allows the TPS client to have read-only permissions to view and search token data of each of each of the plurality of tokens of the group, certificates associated with the plurality of tokens of the group, and activities for the plurality of tokens of the group, and wherein the predefined access of the agent role further allows the TPS client to have read and write permissions to view, search, and modify the token data, the certificates, and the activities.

4. The method of claim 1, further comprising:
    receiving a request from the TPS client to perform the operation, wherein the operation is to search or view all, some, or one of the following: token data of the plurality of tokens, certificates associated with the plurality of tokens, and activities associated with the plurality of tokens;
    determining the predefined role of the TPS client using the token profile to determine role-based access to the token data, certificates, and activities; and
    when the TPS client is determined to be one of an operator, an agent, or an administrator of the group, permitting access to allow the searching or viewing.

5. The method of claim 1, further comprising:
    receiving a request from the TPS client to perform the operation, wherein the operation is to modify all, some, or one of the following as the operation: token data of the plurality of tokens, certificates associated with the plurality of tokens, and activities associated with the plurality of tokens;
determining the predefined role of the TPS client using the token profile to determine role-based access to the token data, certificates, and activities;
when the TPS client is determined to be one of an operator or an administrator of the group, prohibiting access to allow the modifying; and
when the TPS client is determined to be an agent, permitting access to allow the modifying.

6. The method of claim 1, further comprising:
receiving a request from the TPS client to perform the operation, wherein the operation is to modify all, some, or one of the entries corresponding to the plurality of tokens of the group;
determining the predefined role of the TPS client using the token profile to determine role-based access to the entries;
when the TPS client is determined to be one of an operator or an administrator of the group, prohibiting access to allow the modifying; and
when the TPS client is determined to be an agent of the group, permitting access to allow the modifying.

7. The method of claim 6, wherein the request from the TPS client to modify comprises at least one of the following:
a request to modify token data in token-related entries corresponding to one or more of the plurality of tokens;
a request to change a token status of one or more tokens in the token-related entries corresponding to one or more of the plurality of tokens; and
a request to set one or more policies for one or more of the plurality of tokens in the token-related entries.

8. The method of claim 1, further comprising:
receiving a request from the TPS client to perform the operation, wherein the operation is to delete a token from or add a token to the plurality of tokens;
determining the predefined role of the TPS client using the token profile to determine role-based access to the group;
when the TPS client is determined to be one of an operator or an agent of the group, prohibiting access to allow the deleting or adding; and
when the TPS client is determined to be an administrator of the group, permitting access to allow the deleting or adding.

9. The method of claim 1, further comprising:
receiving a request from the TPS client to perform the operation, wherein the operation is to create another TPS client or to modify another TPS client associated with the group;
determining the predefined role of the TPS client using the token profile to determine role-based access to the group;
when the TPS client is determined to be one of an operator or an agent of the group, prohibiting access to allow the creating or modifying; and
when the TPS client is determined to be an administrator of the group, permitting access to allow the creating or modifying.

10. The method of claim 1, further comprising assigning each of the plurality of tokens to the group based on a characteristic of each of the plurality of tokens.

11. The method of claim 1, further comprising assigning a set of identification numbers to the group, wherein each of the set of identification numbers corresponding to one of the plurality of tokens.

12. The method of claim 1, further comprising assigning the plurality of tokens to the group based on a range of card unique identifiers (CUIDs), each CUID corresponding to one of the plurality of tokens.

13. The method of claim 1, further comprising assigning the plurality of tokens to the group based an Answer-to-Reset (ATR) manufacturing identifier for a batch of tokens.

14. The method of claim 1, further comprising assigning the plurality of tokens to the group by adding a group identifier (ID) attribute to each token-related entries corresponding to the plurality of tokens of the group.

15. The method of claim 1, further comprising assigning the plurality of tokens to the group by adding a token profile identifier (ID) attribute to each token-related entries of the plurality of tokens of the group, and wherein assigning the TPS client the token profile comprises adding an auxiliary class with a multi-value attribute that can be attached to a user-related entry in the token database corresponding to the TPS client.

16. The method of claim 15, further comprising, when requested by the TPS client, listing the token-related entries of the token database for which the token profile ID of the TPS client matches a set of token profile IDs permitted by the group.

17. The method of claim 1, wherein the profile data structure is a profile table, and the token profiles are stored as profile records in the profile table.

18. A certificate system, comprising:
a data storage device to store a token profile assigned to a user, wherein the token profile corresponds to a group comprising a plurality of tokens, the token profile stored in a profile data structure, wherein the token profile specifies at least one of a plurality of predefined roles for the user, and wherein each of the plurality of predefined roles is associated with predefined access to entries of a token database; and
a first server, comprising a token processing system (TPS), coupled to the data storage device, wherein the TPS is configured to receive a request from the TPS client over a network to perform an operation on the entries of the token database that correspond to the group, wherein the TPS is configured to communicate over the network with one or more additional clients each having at least one of the plurality of tokens, and wherein the TPS is configured to allow the TPS client access to the token database to perform the operation when permitted by the predefined roles specified in the token profile on the entries of the token database that correspond to a group identified by the token profile.

19. The certificate system of claim 18, further comprising a Lightweight Directory Access Protocol (LDAP) directory server coupled to the first server, wherein the LDAP directory server is configured to manage the entries of the token database as LDAP entries stored in a LDAP repository, and wherein the TPS is configured to manage role-based access control of the LDAP entries using the token profile and the predefined role assigned to the TPS client.

20. The certificate system of claim 18, wherein the TPS comprises a role-based access control module that comprises a token database access manager coupled to the data storage device to access the token profile assigned to the TPS client to determine a role-based access of the TPS client to the entries of the token database stored in the data storage device, and wherein the token database access manager is coupled to receive a request from the TPS client via an interface to access the entries and to control access to the entries based on the role-based access of the TPS client.

21. The certificate system of claim 18, wherein the token profiles are stored as profile records in a profile table.

22. A non-transitory machine-readable storage medium having instructions, which when executed, cause a computing system to perform a method, the method comprising:
assigning a token processing system (TPS) client a token profile for a group comprising a plurality of tokens, the token profile stored in a profile data structure, wherein the token profile specifies at least one of a plurality of predefined roles for the TPS client, and wherein each of the plurality of predefined roles is associated with predefined access to entries of a token database;
receiving, by a TPS executing on the computing system, a request from the TPS client over a network to perform an operation on the entries of the token database that correspond to the group, wherein the TPS is configured to communicate with the token database and configured to communicate over the network with one or more additional clients each having at least one of the plurality of tokens; and
allowing the TPS client access to the token database to perform the operation when permitted by the predefined roles specified in the token profile on the entries of the token database that correspond to the group identified by the token profile.

23. The non-transitory machine-readable storage medium of claim 22, wherein the plurality of predefined roles comprises an operator role, an agent role, and an administrator role, wherein the predefined access of the operator role allows the TPS client to view and search any token-related entries of the token database associated with the group, but not modify any of the token-related entries, wherein the predefined access of the agent role allows the TPS client to view, search, and modify any of the token-related entries, and wherein the predefined access of the administrator role allows the TPS client to view and search any of the token-related entries and view, search, and modify any -event entries of the token database associated with the group.

24. The non-transitory machine-readable storage medium of claim 22, wherein the profile data structure is a profile table, and the token profiles are stored as profile records in the profile table.

* * * * *